US011870116B2

(12) United States Patent
Hamada et al.

(10) Patent No.: US 11,870,116 B2
(45) Date of Patent: Jan. 9, 2024

(54) POWER MANAGEMENT SYSTEM, SERVER, AND POWER SUPPLY AND DEMAND ADJUSTMENT METHOD

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 67 days.

(21) Appl. No.: 17/521,979

(22) Filed: Nov. 9, 2021

(65) Prior Publication Data

US 2022/0200020 A1    Jun. 23, 2022

(30) Foreign Application Priority Data

Dec. 22, 2020  (JP) ................. 2020-212343

(51) Int. Cl.
*H01M 8/04858* (2016.01)
(52) U.S. Cl.
CPC ...... *H01M 8/0494* (2013.01); *H01M 2250/20* (2013.01)

(58) Field of Classification Search
CPC .............. H01M 8/0494; B60L 55/00
See application file for complete search history.

(56) References Cited

U.S. PATENT DOCUMENTS

| 9,225,029 B2 | 12/2015 | Han et al. |
| 2020/0317075 A1 | 10/2020 | Yokoyama et al. |

FOREIGN PATENT DOCUMENTS

JP  2019-129062 A  8/2019

*Primary Examiner* — Sarah A. Slifka
(74) *Attorney, Agent, or Firm* — Finnegan, Henderson, Farabow, Garrett & Dunner, LLP

(57) ABSTRACT

A power management system includes a plurality of power adjustment resources electrically connected to a microgrid, and a CEMS server that manages the plurality of power adjustment resources. The plurality of power adjustment resources include a plurality of FCEVs that supply electric power to the microgrid. Each of the plurality of FCEVs executes a refresh process that removes an oxide film formed on a catalyst electrode of an FC stack by causing the FC stack to generate electric power exceeding prescribed electric power. The CEMS server adjusts execution timings of the refresh process in the plurality of FCEVs during power supply to the microgrid, so as to respond to a request to adjust power supply and demand in the microgrid.

5 Claims, 8 Drawing Sheets

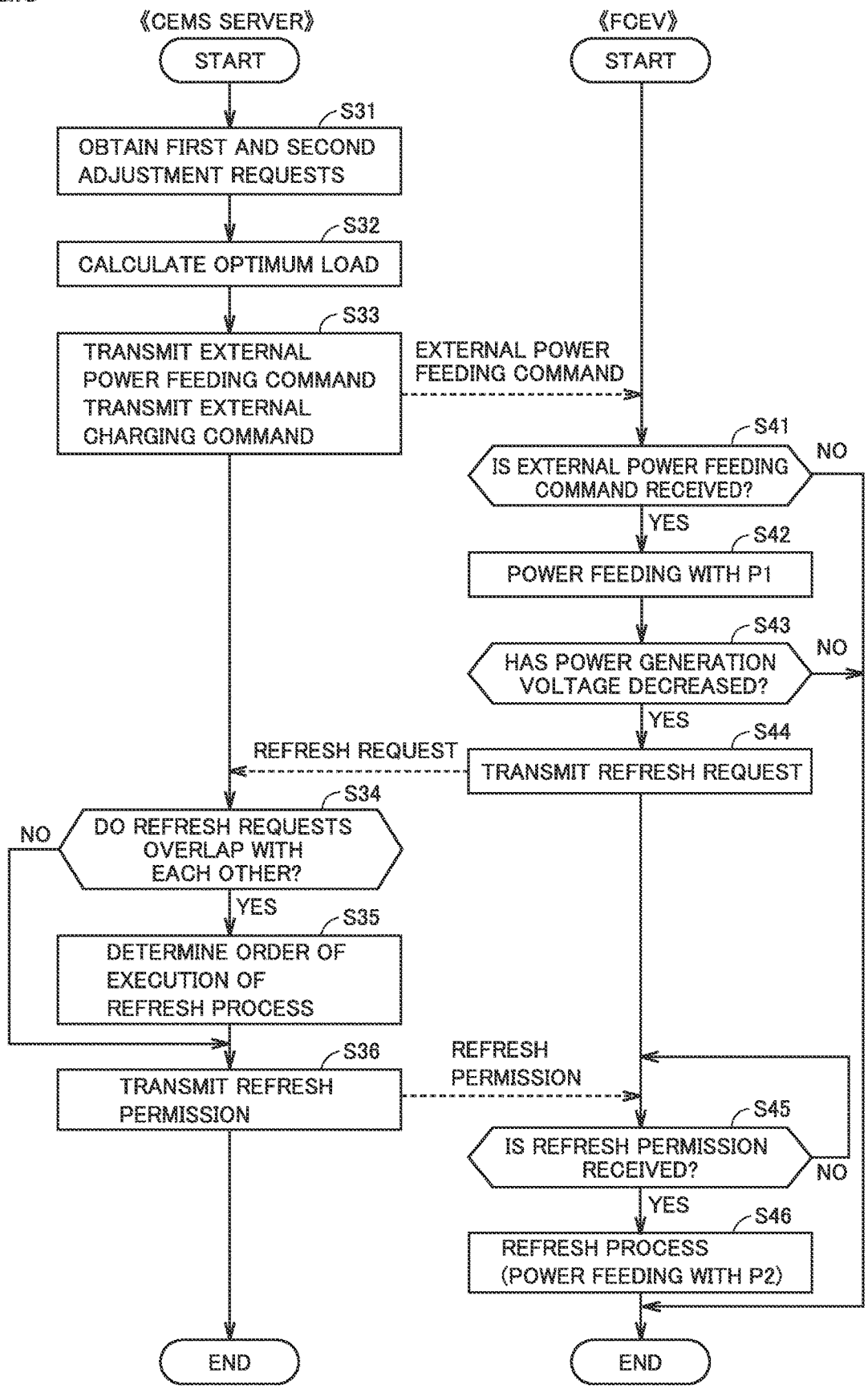

POWER MANAGEMENT SYSTEM, SERVER, AND POWER SUPPLY AND DEMAND ADJUSTMENT METHOD

This nonprovisional application is based on Japanese Patent Application No. 2020-212343 filed on Dec. 22, 2020 with the Japan Patent Office, the entire contents of which are hereby incorporated by reference.

BACKGROUND

Field

The present disclosure relates to a power management system, a server, and a power supply and demand adjustment method.

Description of the Background Art

Japanese Patent Laying-Open No. 2019-129062 discloses a controller for a fuel cell that suppresses degradation of the fuel cell.

SUMMARY

It is known that an oxide film may be formed on a catalyst electrode of a fuel cell. When the oxide film is formed, the power generation efficiency of the fuel cell decreases, and thus, the presence of the oxide film is undesirable. Therefore, a "refresh process" that causes the fuel cell to generate electric power exceeding prescribed electric power is executed to remove the formed oxide film.

In recent years, attention has been focused on a microgrid in which a plurality of power adjustment resources (e.g., a distributed power source, an energy storage system, and an electrical device) form a network and function as one assembly. From the economic perspective and/or from the perspective of reduction in carbon dioxide emissions ($CO_2$ minimum), for example, a server that manages the microgrid may request the power adjustment resources to adjust an amount of electric power during a prescribed time period. By adjustment of the amount of electric power by the power adjustment resources, an amount of electric power supplied from a power grid to the microgrid during the prescribed time period can be adjusted.

The power adjustment resources may include a fuel cell electric vehicle. The fuel cell electric vehicle can supply (feed) electric power generated by a fuel cell to the microgrid. When the power adjustment resources include the fuel cell electric vehicle, it is desirable to appropriately remove an oxide film while supplying the electric power from the fuel cell electric vehicle to the microgrid.

The present disclosure has been made to solve the above-described problem, and an object of the present disclosure is to, when power adjustment resources include a fuel cell electric vehicle, appropriately remove an oxide film during power supply from the fuel cell electric vehicle to a microgrid.

(1) A power management system according to a first aspect of the present disclosure includes: a plurality of power adjustment resources electrically connected to a power grid; and a server that manages the plurality of power adjustment resources. The plurality of power adjustment resources include at least one fuel cell electric vehicle that supplies electric power to the power grid. The at least one fuel cell electric vehicle executes a refresh process that removes an oxide film formed on a catalyst electrode of a fuel cell by causing the fuel cell to generate electric power exceeding prescribed electric power. The server determines execution timings of the refresh process in the at least one fuel cell electric vehicle during power supply to the power grid.

(2) The at least one fuel cell electric vehicle includes a plurality of fuel cell electric vehicles. The server adjusts the execution timings in the plurality of fuel cell electric vehicles during power supply to the power grid.

(3) The server restricts the number of fuel cell electric vehicles that execute the refresh process within a prescribed time period to or below a permissible number. The permissible number is set in accordance with a request to adjust power supply and demand in the power grid.

In the configuration in (1) to (3) described above, the execution timings of the refresh process in the fuel cell electric vehicles are determined by the server. The server adjusts the execution timings of the refresh process in consideration of a state of all of the fuel cell electric vehicles, the request to adjust power supply and demand in the power grid, and the like. For example, the number of fuel cell electric vehicles that execute the refresh process within the prescribed time period (as an example, simultaneously) is restricted to or below the permissible number set in accordance with the request to adjust power supply and demand. Therefore, even when the electric power supplied from the fuel cell electric vehicles to the power gird increases temporarily due to the refresh process, it is possible to remove the oxide films while suppressing an influence on the power grid. Thus, according to the configuration in (1) to (3) described above, the oxide films can be appropriately removed during power supply from the fuel cell electric vehicles to the power grid.

(4) The server adjusts the execution timings such that the refresh process is repeated without any overlap of the execution timings in the plurality of fuel cell electric vehicles.

(5) The execution timings are regular.

In the configuration in (4) and (5) described above, the server causes the fuel cell electric vehicles to simply execute the refresh process intermittently (preferably, regularly), regardless of the state of the fuel cell electric vehicles. Thus, a process executed by the server to manage the execution timings of the refresh process can be simplified.

(6) The plurality of fuel cell electric vehicles transmit requests for the refresh process to the server. When the requests from the plurality of fuel cell electric vehicles overlap with each other, the server permits not more than a permissible number of fuel cell electric vehicles to execute the refresh process. The permissible number is set in accordance with a request to adjust power supply and demand in the power grid.

In the configuration in (6) described above, in response to the request for the refresh process from each fuel cell electric vehicle, the server causes the fuel cell electric vehicle to execute the refresh process. When the refresh process is executed excessively, degradation of the fuel cell may progress. According to the configuration in (6) described above, the number of times of the refresh process is reduced, as compared with the case of executing the refresh process intermittently (regularly) as in (4) and (5) described above, and thus, degradation of the fuel cell can be suppressed.

(7) The plurality of power adjustment resources further include a plurality of power storage facilities that store electric power transmitted to the power grid. The server selects, from the plurality of power storage facilities, a power storage facility that absorbs an increase in the electric power supplied to the power grid due to the refresh process.

According to the configuration in (7) described above, the increase in the electric power supplied from the fuel cell electric vehicles is absorbed by the power storage facility, and thus, the request to adjust power supply and demand (a balance of power supply and demand) in the power grid is easily fulfilled.

(8) A server according to a second aspect of the present disclosure manages a plurality of power adjustment resources electrically connected to a power grid. The plurality of power adjustment resources include at least one fuel cell electric vehicle that supplies electric power to the power grid. The at least one fuel cell electric vehicle executes a refresh process that removes an oxide film formed on a catalyst electrode of a fuel cell by causing the fuel cell to generate electric power exceeding prescribed electric power. The server includes: a processor, and a memory that stores a program executed by the processor. The processor determines execution timings of the refresh process in the at least one fuel cell electric vehicle during power supply to the power grid.

According to the configuration in (8) described above, the oxide film can be appropriately removed during power supply from the fuel cell electric vehicle to the power grid, similarly to the configuration in (1) described above.

(9) A power supply and demand adjustment method according to a third aspect of the present disclosure manages a plurality of power adjustment resources electrically connected to a power grid. The plurality of power adjustment resources include at least one fuel cell electric vehicle that supplies electric power to the power grid. The at least one fuel cell electric vehicle executes a refresh process that removes an oxide film formed on a catalyst electrode of a fuel cell by causing the fuel cell to generate electric power exceeding prescribed electric power. The method includes a first step and a second step. The first step is determining execution timings of the refresh process in the at least one fuel cell electric vehicle during power supply to the power grid, and transmitting a command to execute the refresh process based on a result of determination. The second step is causing a fuel cell electric vehicle that receives the command, of the at least one fuel cell electric vehicle, to execute the refresh process.

According to the method in (9) described above, the oxide film can be appropriately removed during power supply from the fuel cell electric vehicle to the power grid, similarly to the configurations in (1) and (8) described above.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a flowchart showing a power supply and demand adjustment method in a second embodiment.

DESCRIPTION OF THE PREFERRED EMBODIMENTS

Figure 1:
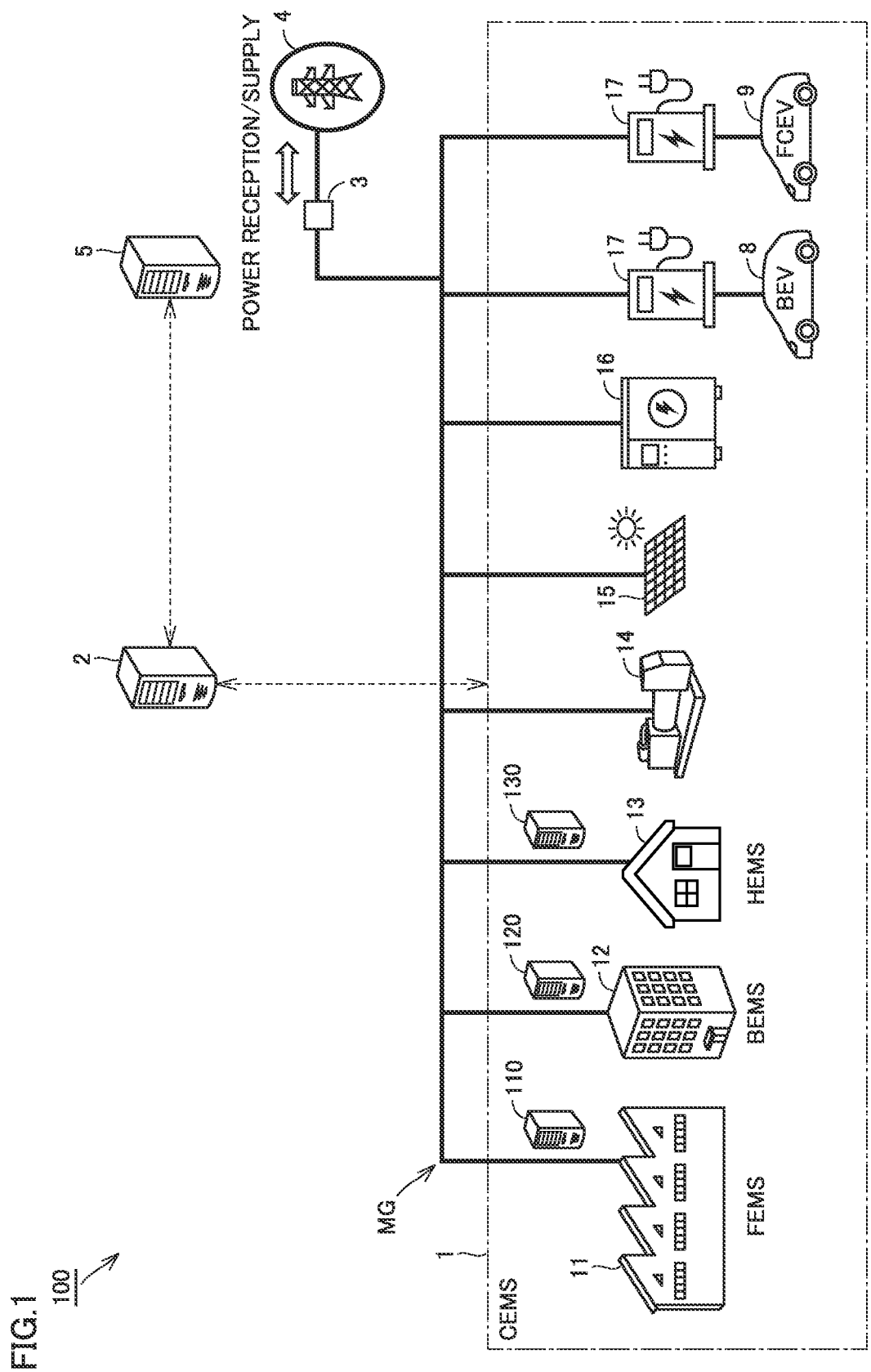
FIG. 1 shows a schematic configuration of a power management system according to a first embodiment of the present disclosure.

Embodiments of the present disclosure will be described in detail hereinafter with reference to the drawings, in which the same or corresponding portions are denoted by the same reference characters, and description thereof will not be repeated.

First Embodiment

<Overall Configuration of Power Management System>

FIG. 1 shows a schematic configuration of a power management system according to a first embodiment of the present disclosure. A power management system 100 includes a CEMS 1, a CEMS server 2, a power reception and transformation facility 3, a power system 4, and a power transmission and distribution business operator server 5. CEMS stands for Community Energy Management System or City Energy Management System.

CEMS 1 includes a factory energy management system (FEMS) 11, a building energy management system (BEMS) 12, a home energy management system (HEMS) 13, a power generator 14, a variable renewable energy (VRE) source 15, an energy storage system (ESS) 16, a plurality of electric vehicle supply equipment (EVSEs) 17, a plurality of battery electric vehicles (BEVs) 8, and a plurality of fuel cell electric vehicles (FCEVs) 9. In CEMS 1, these components form a microgrid MG. Microgrid MG corresponds to an example of "power grid" according to the present disclosure.

FEMS 11 is a system that manages supply and demand of electric power used in a factory. FEMS 11 includes a factory building (including a lighting fixture, an air-conditioning facility and the like), an industrial facility (such as a production line) and the like that operate using electric power supplied from microgrid MG. Although not shown, FEMS 11 may include a power generation facility (such as a power generator or a solar panel) placed in the factory. Electric power generated by the power generation facility may also be supplied to microgrid MG. FEMS 11 further includes an FEMS server 110 that can bidirectionally communicate with CEMS server 2.

BEMS 12 is a system that manages supply and demand of electric power used in a building such as an office or a commercial facility. BEMS 12 includes a lighting fixture and an air-conditioning facility placed in the building. BEMS 12 may include a power generation facility (such as a solar panel), or may include a cold source system (such as a waste heat recovery system or a heat storage system). BEMS 12 further includes a BEMS server 120 that can bidirectionally communicate with CEMS server 2.

HEMS 13 is a system that manages supply and demand of electric power used at home. HEMS 13 includes a household device (such as a lighting fixture, an air-conditioning device and another electric appliance) that operates using electric power supplied from microgrid MG. HEMS 13 may also include a solar panel, a household heat pump system, a household cogeneration system, a household power storage battery or the like. HEMS 13 further includes an HEMS server 130 that can bidirectionally communicate with CEMS server 2.

Power generator 14 is a power generation facility that does not depend on weather conditions, and outputs generated electric power to microgrid MG. Power generator 14 may include a steam turbine generator, a gas turbine generator, a diesel engine generator, a gas engine generator, a biomass generator, a stationary-type fuel cell or the like. Power generator 14 may include a cogeneration system that uses heat generated during power generation.

VRE source 15 is a power generation facility whose power generation output fluctuates depending on weather conditions, and outputs generated electric power to microgrid MG. Although FIG. 1 shows a photovoltaic power generation facility (solar panel) by way of example, VRE source 15 may include a wind power generation facility instead of or in addition to the photovoltaic power generation facility.

Energy storage system 16 is a stationary-type power source that stores the electric power generated by VRE source 15 and the like. Energy storage system 16 is a secondary battery, and is, for example, a battery (recycled battery) used in a vehicle, such as a lithium ion battery or a nickel-metal hydride battery. However, energy storage system 16 is not limited to the secondary battery, and may be a power to gas device that produces gas fuel (such as hydrogen or methane) using surplus electric power.

Each of the plurality of EVSEs 17 is electrically connected to microgrid MG so as to allow the exchange of electric power with microgrid MG. In the present embodiment, DC-type EVSEs are used as EVSEs 17.

When a charging cable is connected to an inlet (not shown) of each of the plurality of BEVs 8, electric power can be supplied from microgrid MG to BEV 8 through EVSE 17. This manner of power supply will also be referred to as "external charging". When EVSE 17 is of DC type, DC/AC conversion is performed by an inverter (not shown) built into EVSE 17, and the AC power is supplied to BEV 8.

When a charging cable is connected to an outlet 912 (see FIG. 2) of each of the plurality of FCEVs 9, electric power can be supplied from FCEV 9 to microgrid MG through EVSE 17. This manner of power supply will also be referred to as "external power feeding". When EVSE 17 is of DC type, DC power is supplied from FCEV 9 to EVSE 17, and DC/AC conversion is performed by the inverter built into EVSE 17.

However, EVSE 17 of DC type is only illustrative, and EVSE 17 may be of AC type. In this case, DC/AC conversion is performed by a vehicle-mounted inverter (not shown), and the converted AC power is supplied from FCEV 9 to EVSE 17.

Each BEV 8 may perform external power feeding in addition to external charging. Each FCEV 9 may perform external charging in addition to external power feeding. In addition, CEMS 1 may include different types of vehicles other than BEVs 8 and FCEVs 9. Specifically, CEMS 1 may include a plug-in hybrid electric vehicle (PHEV) that performs external power feeding in addition to external charging. Each vehicle may be a vehicle owned by an individual, or may be a vehicle (mobility as a service (MaaS) vehicle) managed by an MaaS business operator.

Although one FEMS 11, one BEMS 12, one HEMS 13, one power generator 14, one VRE source 15, and one energy storage system 16 are included in CEMS 1 in the example shown in FIG. 1, the number of these systems or facilities included in CEMS 1 is arbitrary. CEMS 1 may include a plurality of these systems or facilities. Alternatively, some of these systems or facilities may not be included in CEMS 1. FEMS 11, BEMS 12 and/or HEMS 13 may include a facility such as a power generator, or may include EVSEs 17, BEVs 8 and FCEVs 9.

Each of FEMS 11 (such as a factory building and an industrial facility), BEMS 12 (such as a lighting fixture and an air-conditioning facility), HEMS 13 (such as a household device), power generator 14, VRE source 15, and energy storage system 16 included in CEMS 1 corresponds to an example of "at least one/a plurality of power adjustment resources" according to the present disclosure. In addition, each of BEVs 8 and FCEVs 9 also corresponds to an example of "at least one/a plurality of power adjustment resources" according to the present disclosure.

CEMS server 2 is a computer that manages the power adjustment resources in CEMS 1. CEMS server 2 includes a controller (not shown), a storage device 21 (see FIG. 5) and a communication device (not shown). The controller includes a processor, and executes a prescribed computation process. Storage device 21 includes a memory that stores a program executed in the controller, and stores various types of information (such as a map, a relational equation and a parameter) used in the program. The communication device includes a communication interface, and communicates with the outside (such as another server).

CEMS server 2 may be an aggregator server. The aggregator refers to an electric power supplier that controls a plurality of power adjustment resources and provides an energy management service. CEMS server 2 corresponds to an example of "server" according to the present disclosure. The server (110, 120, 130) included in each of FEMS 11, BEMS 12 and HEMS 13 can also serve as "server" according to the present disclosure.

Power reception and transformation facility 3 is provided at an interconnection point (power receiving point) of microgrid MG, and switches between parallel on (connection) and parallel off (disconnection) of microgrid MG and power system 4. Power reception and transformation facility 3 includes a high-voltage-side (primary-side) switchgear, a transformer, a protective relay, a measuring device, and a controller, although all are not shown. When microgrid MG is interconnected with power system 4, power reception and transformation facility 3 receives AC power having, for example, a particularly high voltage (voltage exceeding 7000 V) from power system 4, and steps down the received electric power, which is supplied to microgrid MG.

Power system 4 is a power grid formed by a power plant and a power transmission and distribution facility. In the present embodiment, an electric power company serves as a power generation business operator and a power transmission and distribution business operator. The electric power company corresponds to a general power transmission and distribution business operator and also corresponds to a manager of power system 4, and the electric power company performs maintenance and management of power system 4.

Power transmission and distribution business operator server 5 belongs to the electric power company, and is a computer that manages power supply and demand in power system 4. Power transmission and distribution business operator server 5 can also bidirectionally communicate with CEMS server 2.

<Adjustment of Power Supply and Demand>

In the present embodiment, a manager of CEMS 1 has a power contract with the electric power company. In accordance with the power contract, the electric power company supplies electric power to microgrid MG formed in CEMS 1, and gets paid. The electric power received by microgrid MG from power system 4 is determined based on the power contract. Hereinafter, this electric power will be referred to as "contract power".

The contract power may be a value (kWh/h) obtained by dividing an amount of electric power (kWh) during a prescribed target time period by a length (h) of the target time period. In the present embodiment, it is assumed that the contract power is electric power (kWh/h) during the target time period, and the length of the target time period is 30 minutes (=0.5 hours). In this case, the target time period is set at intervals of 30 minutes, and every time the target time period elapses, the amount of electric power during the target time period is evaluated.

In cooperation with power transmission and distribution business operator server 5, CEMS server 2 adjusts power supply and demand in microgrid MG such that the electric power supplied from power system 4 to microgrid MG during the target time period satisfies the contract power. "The supplied electric power satisfies the contract power" means that the supplied electric power during the target time period is neither too much nor too little with respect to the contract power (falls within a range determined as the contract power).

Specifically, power adjustment resource identification information (resource ID) is assigned to each power adjustment resource. Based on the resource ID, CEMS server 2 identifies and manages data about a state (such as consumed power, generated power and an amount of stored power) of each power adjustment resource. CEMS server 2 obtains the state of each power adjustment resource by communication with the power adjustment resource (or a detection value from a sensor, or the like), and updates the above-described data based on a result of obtainment. By transmitting a power command to a selected power adjustment resource, of the plurality of power adjustment resources, CEMS server 2 can remotely control a charging and discharging operation of this selected power adjustment resource.

Furthermore, in the present embodiment, when the plurality of FCEVs 9 are connected to EVSEs 17, each FCEV 9 performs external power feeding in accordance with an instruction from CEMS server 2. Electric power is supplied from each FCEV 9 to microgrid MG under remote control by CEMS server 2, and thus, power supply and demand in microgrid MG is adjusted.

Specifically, each EVSE 17 and CEMS server 2 communicate with each other directly. Each FCEV 9 and CEMS server 2 communicate with each other indirectly through EVSE 17. CEMS server 2 manages information about each FCEV 9 (vehicle information) and information about each EVSE 17 (EVSE information). The vehicle information and the EVSE information are identified based on identification information (ID). The EVSE information may include a state of FCEV 9 connected to EVSE 17. The EVSE information may also include information indicating a combination of FCEV 9 and EVSE 17 connected to each other (e.g., information indicating a combination of a vehicle ID and an EVSE-ID). By transmitting a power command (external power feeding command described below) to EVSE 17 connected to selected FCEV 9, of the plurality of FCEVs 9, CEMS server 2 can remotely control a power feeding operation of this selected FCEV 9.

<Configuration of FCEV>

Figure 2:
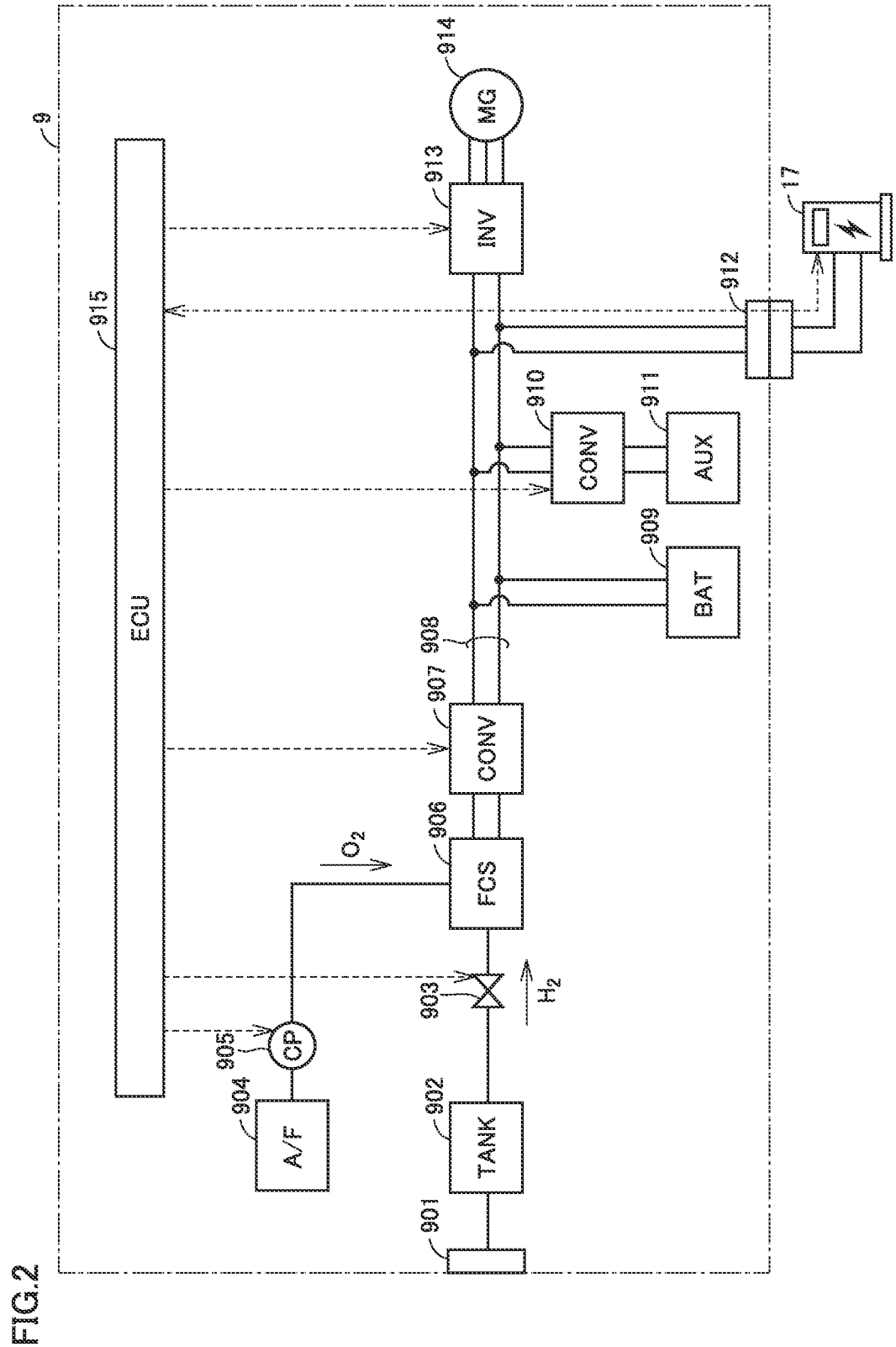
FIG. 2 schematically shows an example of an overall configuration of a fuel cell electric vehicle.

FIG. 2 schematically shows an example of an overall configuration of FCEV 9. FCEV 9 includes a receptacle 901, a hydrogen tank 902, a supply valve 903, an air filter 904, a compressor 905, an FC stack 906, a step-up converter 907, a power line 908, a battery 909, a step-down converter 910, an auxiliary load 911, outlet 912, an inverter 913, a motor generator 914, and an electronic control unit (ECU) 915.

Receptacle 901 is supplied with a hydrogen fuel from a hydrogen dispenser (not shown) placed in a hydrogen station. Hydrogen tank 902 stores the hydrogen fuel supplied through receptacle 901. Supply valve 903 adjusts an amount of supply of hydrogen from hydrogen tank 902 to FC stack 906 in accordance with a control command from ECU 915.

Air filter 904 removes dust and the like in the air suctioned from the atmosphere. Compressor 905 compresses the air suctioned through air filter 904, and supplies the compressed air to FC stack 906.

FC stack 906 is, for example, a structure formed by stacking a plurality of solid-polymer-type fuel cell units in series. Each unit is formed, for example, by bonding catalyst electrodes to both surfaces of an electrolyte film, and sandwiching the catalyst electrodes and the electrolyte film between electrically conductive separators (not shown). FC stack 906 generates electric power by electrochemical reaction of hydrogen supplied to an anode and oxygen (air) supplied to a cathode.

Step-up converter 907 steps up the electric power generated by FC stack 906 to a high voltage (e.g., several hundred volts) in accordance with a control command from ECU 915, and outputs the stepped-up electric power to power line 908. Power line 908 electrically connects step-up converter 907 to inverter 913.

Battery 909 is electrically connected to power line 908. Battery 909 includes an assembled battery composed of a plurality of cells. Each battery cell is, for example, a secondary battery such as a lithium ion battery or a nickel-metal hydride battery. Battery 909 stores electric power for driving motor generator 914, and supplies the electric power to inverter 913. In addition, battery 909 receives electric power generated by motor generator 914 during braking of FCEV 9 and the like, and is charged with the electric power. In the present embodiment, battery 909 can function as an energy buffer that absorbs fluctuations of the external power feeding power from FCEV 9.

Step-down converter 910 is electrically connected between power line 908 and auxiliary load 911. Step-down converter 910 steps down the electric power transmitted on power line 908 to a prescribed voltage, and outputs the stepped-down electric power to auxiliary load 911. Auxiliary load 911 corresponds to various devices that are driven by consuming the electric power supplied from step-down converter 910. Auxiliary load 911 may include lamps (such as ahead lamp, a fog lamp, a cornering signal lamp, and a corner lamp), an audio device, a car navigation system, an antilock brake system (ABS), an oil pump, meters, a defogger, a wiper and the like. Similarly to battery 909, auxiliary load 911 may also function as an energy buffer.

A connector of the charging cable extending from EVSE 17 is fittable to outlet 912. Outlet 912 receives the electric power transmitted on power line 908, and outputs the electric power to EVSE 17. As a result, the electric power generated by FCEV 9 (FC stack 906) can be supplied to microgrid MG (external power feeding).

Inverter 913 is electrically connected between power line 908 and motor generator 914. Inverter 913 drives motor generator 914 based on a drive signal from ECU 915. Motor generator 914 is implemented by, for example, a three-phase AC synchronous motor including a rotor having a permanent magnet embedded therein. Motor generator 914 is driven by inverter 913 to generate rotational driving force. The driving force generated by motor generator 914 is transmitted to a not-shown driving wheel.

ECU 915 includes a processor, a memory and an I/O port, although all are not shown. ECU 915 controls the devices that form FCEV 9, based on a program stored in the memory and signals from various sensors. ECU 915 may be divided into a plurality of ECUs for each function.

In the present embodiment, ECU 915 controls external power feeding performed by FCEV 9, in cooperation with CEMS server 2 and EVSE 17 (a not-shown controller in EVSE 17). ECU 915 controls step-up converter 907 such that output power requested for FC stack 906 is calculated and FC stack 906 outputs the calculated power based on an external power feeding command from CEMS server 2 and EVSE 17.

<Refresh Process>

It is known that an oxide film may be formed on a surface of a platinum catalyst (catalyst layer) in a fuel cell. Specifically, when power generation by a fuel cell is continued in a state where a cell voltage is within an oxidation region, formation of an oxide film on a surface of a platinum catalyst progresses, which may cause a reduction in effective area of the platinum catalyst. As a result, the performance of the platinum catalyst decreases, which may in turn cause a reduction in power generation efficiency of the fuel cell. The oxide film tends to be formed when the electric power generated by the fuel cell is small. Conversely, by causing the fuel cell to generate electric power exceeding prescribed electric power and lowering a cathode potential to a reduction potential, the oxide film can be removed from the surface of the platinum catalyst and the power generation efficiency can be recovered. This process is also called "refresh process".

Figure 3:
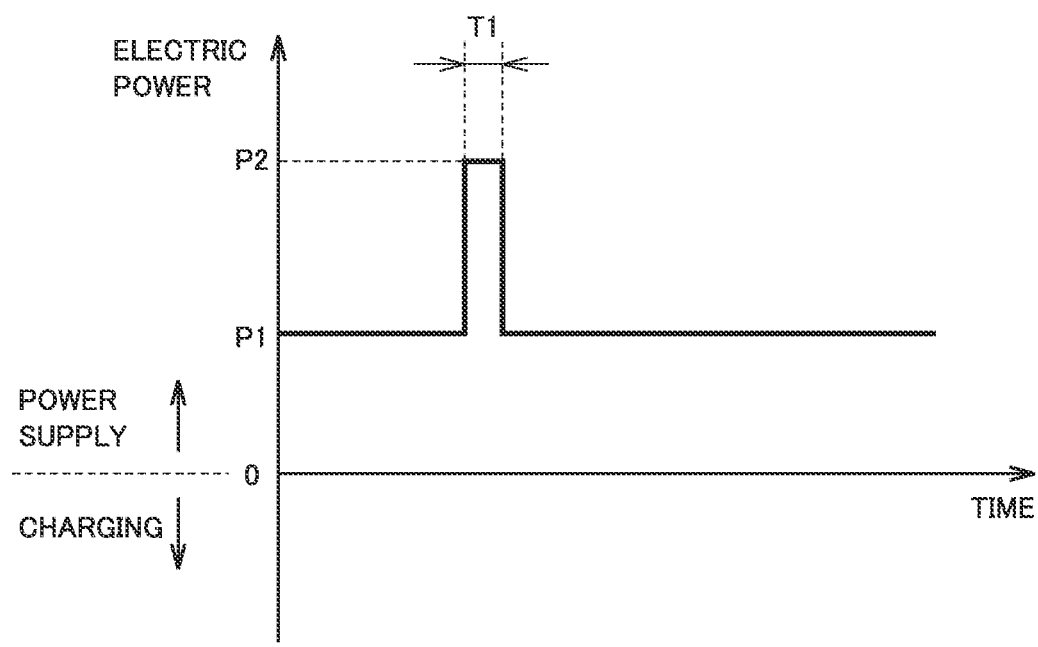
FIG. 3 is a diagram for illustrating an example of a refresh process.

FIG. 3 is a diagram for illustrating an example of a refresh process. In FIG. 3, the horizontal axis represents the elapsed time. The vertical axis represents the electric power (supply power) supplied from FCEV 9 to microgrid MG through EVSE 17. The same applies as well to FIG. 4 and the like described below.

Power supply from FCEV 9 to microgrid MG is often performed with constant power P1. P1 is basically determined by CEMS server 2 in accordance with power supply and demand in microgrid MG. However, P1 may in some cases be restricted by laws and regulations and the like. P1 is set at a value that can satisfy the restriction and maintain a balance of power supply and demand in microgrid MG.

In the refresh process in the present embodiment, FCEV 9 temporarily increases the supply power from P1 to P2 during power supply with constant power P1, in accordance with a command from CEMS server 2. P2 is a value set in accordance with the configuration of FC stack 906 (such as a material of the catalyst electrode), and can be electric power that is approximately several times (e.g., one and a half times to five times) as large as P1. A time period T1 in which the supply power is increased to P2 may be a short time period of approximately several hundred milliseconds to several seconds. By executing such a refresh process, formation of the oxide film on the catalyst electrode can be suppressed and the oxide film adhering onto the catalyst electrode can be removed (at least reduced). As a result, a reduction in power generation efficiency of FC stack 906 can be suppressed.

<Adjustment of Execution Timings of Refresh Process>

When CEMS 1 includes FCEVs 9 as the power adjustment resources, it is desirable that CEMS server 2 cause each FCEV 9 to perform external power feeding to microgrid MG as appropriate, to thereby appropriately remove the oxide film formed on the catalyst electrode of each FCEV 9, while adjusting power supply and demand in microgrid MG.

In view of the above-described problem, the inventors of the present disclosure have focused attention on the fact that the plurality of FCEVs 9 are included in CEMS 1 and a plurality of power storage facilities (energy storage system 16 and BEVs 8) that can store the supply power from FCEVs 9 are also included in CEMS 1. In the present embodiment, CEMS server 2 determines execution timings of the refresh process and instructs corresponding FCEVs 9 to execute the refresh process. Particularly, CEMS server 2 adjusts the execution timings of the refresh process in the plurality of FCEVs 9. Furthermore, CEMS server 2 selects a power storage facility from the plurality of power storage facilities, and causes the power storage facility to absorb an increase in the supply power caused by the refresh process.

Figure 4:
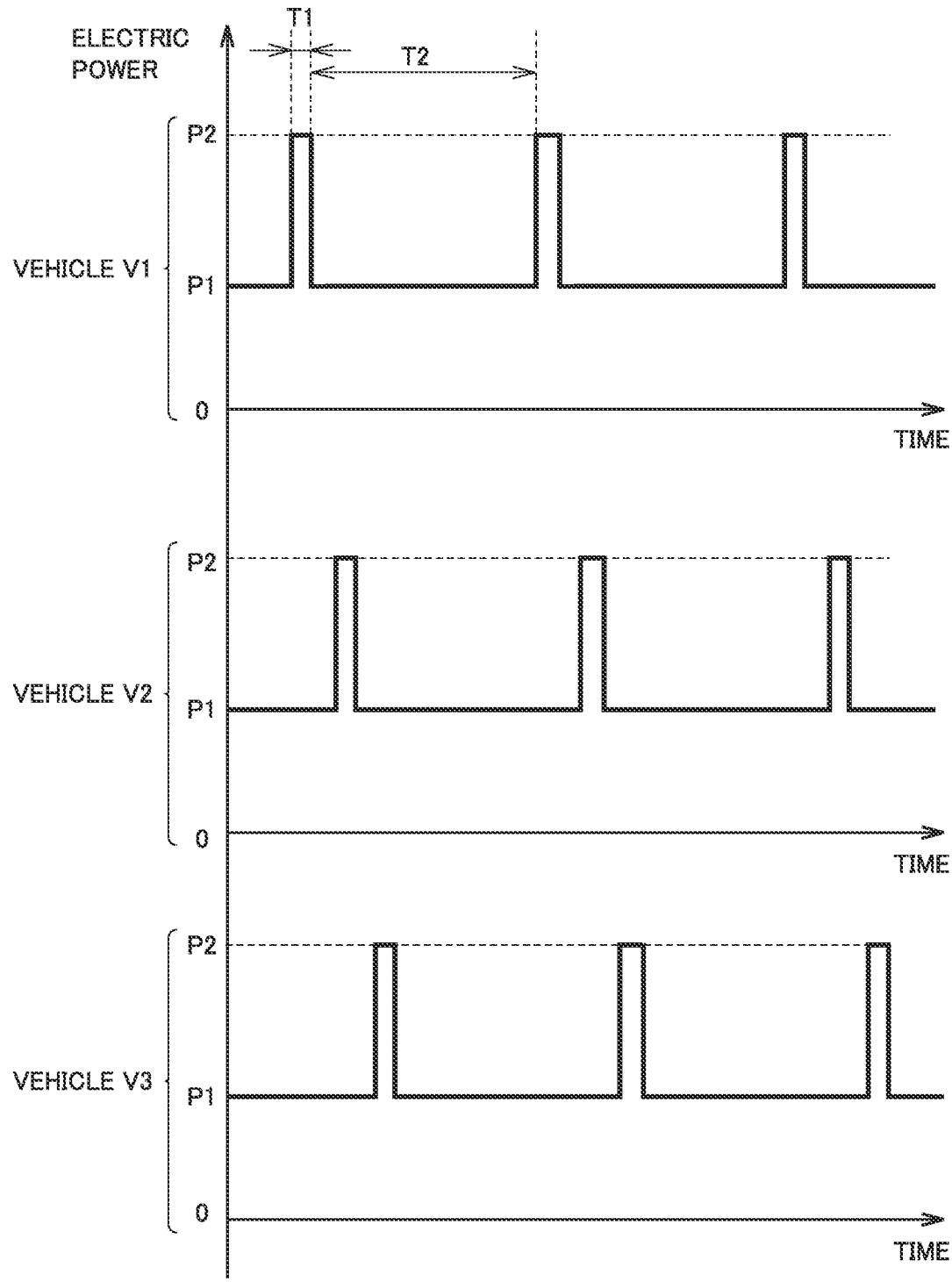
FIG. 4 is a time chart showing execution timings of the refresh process in the first embodiment.

FIG. 4 is a time chart showing the execution timings of the refresh process in the first embodiment. For convenience of explanation, the situation in which three FCEVs 9 are included in CEMS 1 is assumed in FIG. 4. In order to distinguish three FCEVs 9, three FCEVs 9 are denoted as vehicles V1 to V3. However, the number of FCEVs 9 included in CEMS 1 is not particularly limited, and is larger in many cases.

CEMS server 2 controls vehicles V1 to V3 such that each of vehicles V1 to V3 repeats the refresh process intermittently. In this example, each of vehicles V1 to V3 executes the refresh process regularly in accordance with the power command (refresh command) from CEMS server 2. More specifically, each of vehicles V1 to V3 executes the refresh process for short time period T1 (e.g., approximately several seconds), and then, continues power supply with P1 for a long time period T2 (e.g., several tens of minutes), and then, again executes the refresh process for short time period T1.

When any one of vehicles V1 to V3 executes the refresh process, the supply power to microgrid MG increases by an amount of electric power corresponding to a difference (=P2-P1) between P2 and P1, as compared with when vehicles V1 to V3 do not execute the refresh process. In the present embodiment, in order to adjust power supply and demand between microgrid MG and power system 4 (maintain a balance of power supply and demand in microgrid MG), the increase in the supply power caused by the refresh process is absorbed by another power adjustment resource in CEMS 1. Taking BEVs 8 as an example, the increase in the supply power caused by the refresh process can be absorbed by performing external charging of BEV 8 including a battery having a low state of charge (SOC), or temporarily increasing external charging power supplied to BEV 8. Instead of or in addition to BEVs 8, energy storage system 16 may be used.

When the execution timings of the refresh process in vehicles V1 to V3 overlap with each other, the increase in the supply power to microgrid MG also becomes greater by the amount of overlap. When the execution timings of the refresh process in too many FCEVs 9 overlap with each other, a balance of power supply and demand in microgrid MG may also be lost. Therefore, CEMS server 2 in the present embodiment restricts the number of FCEVs 9 that execute the refresh process simultaneously to or below the permissible number set in accordance with a request to adjust power supply and demand in microgrid MG. In the example shown in FIG. 4, the permissible number is one and the execution timings of the refresh process in vehicles V1 to V3 are adjusted so as not to overlap with each other. By avoiding the overlap of the execution timings as described above, a balance of power supply and demand in microgrid MG can be maintained. In addition, selection and control of the power storage facility for absorbing the increase in the supply power can also become easy.

The description has been given herein of the example in which the number of FCEVs 9 that execute the refresh process "simultaneously" is restricted. Since a time period required for the refresh process is short (normally, several seconds at most), "simultaneously" may be interpreted more widely as "within a prescribed time period". Placing an upper limit (permissible number) on the number of FCEVs 9 that execute the refresh process within the prescribed time period (e.g., within several tens of seconds to several minutes) is synonymous with CEMS server 2 restricting the number of FCEVs 9 that execute the refresh process "simultaneously".

<Power Adjustment Function>

Next, a power adjustment function of each server will be described in more detail. Power transmission and distribution business operator server 5 transmits, to CEMS server 2, "first adjustment request" to request adjustment of power supply and demand between microgrid MG and power system 4. The first adjustment request is, for example, a signal that requests adjustment of a frequency of power system 4 within a prescribed response time period (e.g., five minutes). An interval of the requested frequency adjustment may be equal to or longer than 0.5 seconds and equal to or shorter than 30 seconds. The first adjustment request may request the frequency adjustment with only a forward power flow or with only a reverse power flow, or may request the forward power flow and the reverse power flow alternately. The first adjustment request may be a load frequency control (LFC) signal, or may be an economic load dispatching control (EDC) signal, or may be a superimposed signal of the LFC signal and the EDC signal. "First adjustment request" corresponds to an example of "request to adjust power supply and demand" according to the present disclosure.

Hereinafter, the function of FEMS server 110, of FEMS server 110, BEMS server 120 and HEMS server 130, will be described representatively. However, BEMS server 120 and HEMS server 130 may also have an equivalent (or simpler) function.

Figure 5:
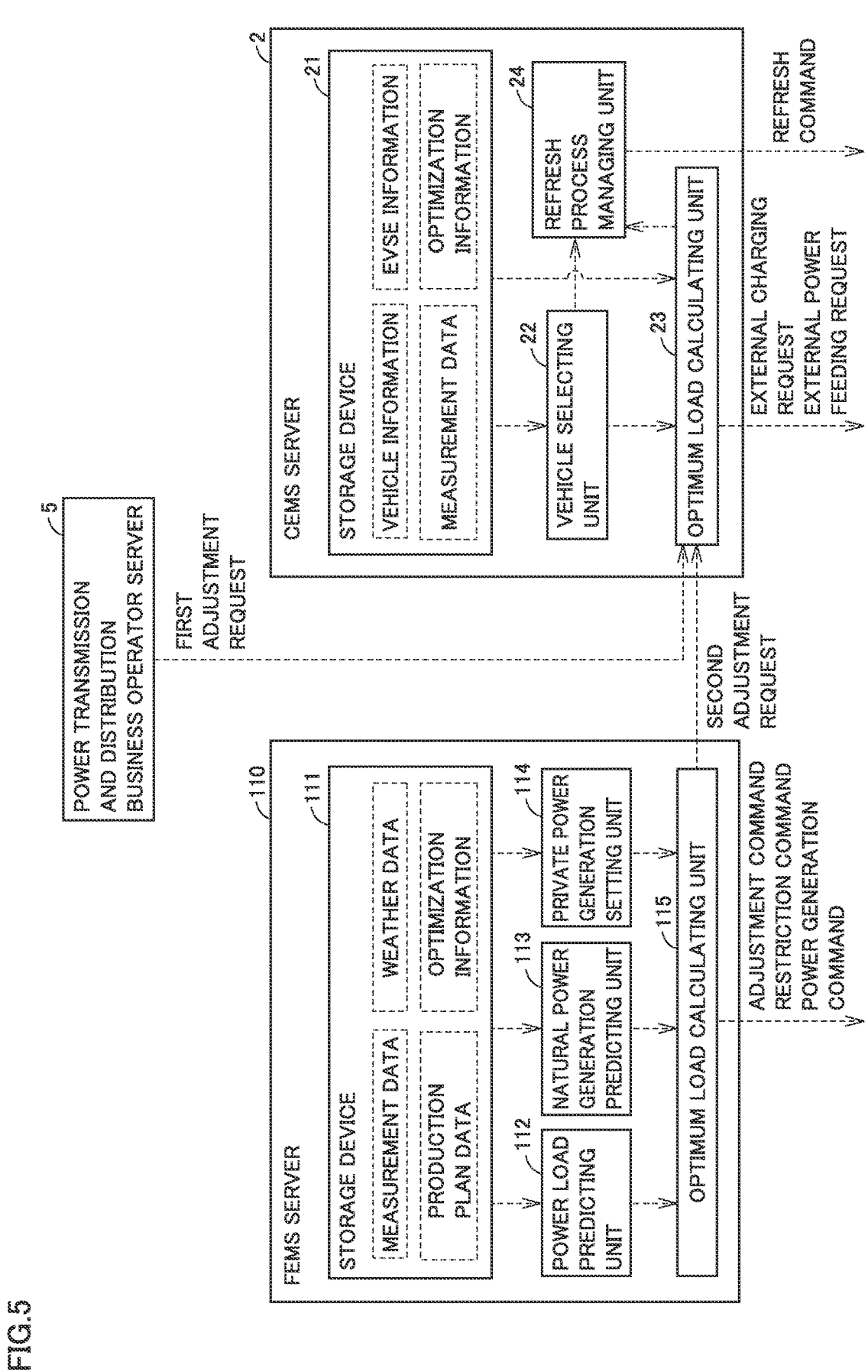
FIG. 5 is a functional block diagram showing components of each of an FEMS server and a CEMS server for each function.

FIG. 5 is a functional block diagram showing components of each of FEMS server 110 and CEMS server 2 for each function. FEMS server 110 manages the power adjustment resources in FEMS 11 such that a power load and the generated power in FEMS 11 are optimized. FEMS server 110 includes a storage device 111, a power load predicting unit 112, a natural power generation predicting unit 113, a private power generation setting unit 114, and an optimum load calculating unit 115.

Storage device 111 is, for example, a database that stores measurement data, weather data, production plan data, and optimization information. The measurement data is data about a past or present state (such as a temperature, an intensity of solar radiation and a power load) of the factory obtained using a not-shown sensor and the like. The weather data may include data about future weather conditions (such as a temperature and an intensity of solar radiation) predicted by the Meteorological Agency and the like. The production plan data is data about a product production plan in the factory. The production plan data is input by, for example, a manager of the factory. The optimization information may include, for example, the contract power, information for calculating the power cost, and information for calculating a $CO_2$ emission intensity.

Using the measurement data and/or the production plan data, power load predicting unit 112 predicts the power load in the factory for carrying out the production plan in the factory. The power load in the factory may also fluctuate depending on the temperature and the intensity of solar radiation. Power load predicting unit 112 may correct the power load in the factory, using measurement data about the temperature and the intensity of solar radiation. Transition of the power load in the factory is output to optimum load calculating unit 115.

Using the weather data, natural power generation predicting unit 113 predicts electric power generated by the VRE source (not shown) during the target time period. Using a preliminarily prepared power generation prediction map, natural power generation predicting unit 113 can obtain transition of the electric power generated by the VRE source during the target time period, based on the weather conditions during the target time period. The transition of the electric power generated by the VRE source is output to optimum load calculating unit 115.

Using the measurement data and/or the weather data, private power generation setting unit 114 sets electric power generated by the power generator (not shown) during the target time period. Using a preliminarily prepared map, private power generation setting unit 114 can set transition of the electric power generated by the power generator during the target time period, based on the measurement data and/or the weather data. The transition of the electric power generated by the power generator is output to optimum load calculating unit 115.

Using the transition of the above-described electric power (the power load in the factory, the electric power generated by the VRE source, and the electric power generated by the power generator) and the optimization information, optimum load calculating unit 115 calculates an optimum power load (optimum load) for the factory such that the power cost and the $CO_2$ emission intensity in the factory become sufficiently low. Optimum load calculating unit 115 transmits an adjustment command, a restriction command and a power generation command in accordance with a result of calculation of the optimum load, to thereby adjust power supply and demand in the factory. The adjustment command is a command for adjusting the power load in the factory building, the industrial facility and the like. The restriction command is a command for restricting the electric power generated by the VRE source, when an amount of the electric power generated by the VRE source in the factory is too large and exceeds a power storage capacity in the factory, for example. The power generation command is a command for controlling the electric power generated by the power generator such that the $CO_2$ emission intensity during the target time period does not become too high.

In addition, optimum load calculating unit 115 generates "second adjustment request" to request adjustment of power supply and demand between the factory and microgrid MG (another component of microgrid MG) during the target time period, based on a difference between an amount of generated power and an amount of consumed power in the factory during the target time period. The generated second adjustment request is transmitted to CEMS server 2. "Second adjustment request" corresponds to another example of "request to adjust power supply and demand" according to the present disclosure.

In cooperation with each server such as FEMS server 110, CEMS server 2 responds to the first and second adjustment requests. CEMS server 2 includes storage device 21, a vehicle selecting unit 22, an optimum load calculating unit 23, and a refresh process managing unit 24. Although not shown to avoid complication of the drawing, CEMS server 2 may include a power load predicting unit, a natural power generation predicting unit and a private power generation setting unit, similarly to FEMS server 110.

Storage device 21 is a database that stores the vehicle information of each of the vehicles (BEVs 8 and FCEVs 9), the EVSE information of each of EVSEs 17, the above-described measurement data, and the optimization information.

Vehicle selecting unit 22 obtains an operation schedule of each vehicle (e.g., an operation plan of the MaaS vehicle), and recognizes, as standby vehicles, vehicles that are currently connected to EVSEs 17 and are not scheduled to travel during the target time period, for example. Then, based on the SOCs of the batteries of BEVs 8 recognized as standby vehicles, vehicle selecting unit 22 calculates an amount of electric power that can be externally charged into these BEVs 8 during the target time period. In addition, based on the amount of the hydrogen fuel stored in hydrogen tanks 902 (see FIG. 2) of FCEVs 9 recognized as standby vehicles, vehicle selecting unit 22 calculates an amount of electric power that can be externally supplied from these FCEVs 9 during the target time period. Then, based on the operation schedule of each vehicle and a state (such as a remaining amount of power or a remaining amount of hydrogen fuel) of each vehicle, vehicle selecting unit 22 selects, from the standby vehicles, vehicles for responding to the first and second adjustment requests. A result of selection by vehicle selecting unit 22 is output to optimum load calculating unit 23.

Optimum load calculating unit 23 receives the first adjustment request during the target time period from power transmission and distribution business operator server 5, and receives the second adjustment request during the target time period from FEMS server 110 (optimum load calculating unit 115). Optimum load calculating unit 23 calculates an optimum load in CEMS 1 such that the power cost and the $CO_2$ emission intensity of each facility in CEMS 1 become sufficiently low, while responding to the first and second adjustment requests.

Figure 6:
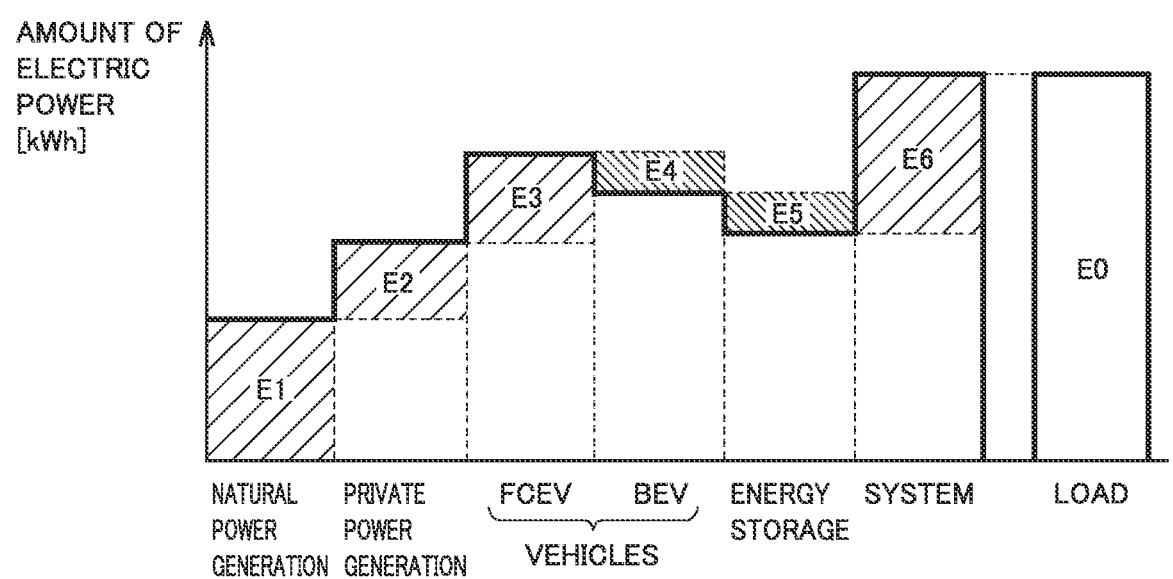
FIG. 6 is a diagram for illustrating an example of a method for calculating an optimum load by the CEMS server.

FIG. 6 is a diagram for illustrating an example of a method for calculating the optimum load by CEMS server 2 (optimum load calculating unit 23). The amount of electric power generated by VRE source 15 (amount of natural power generation E1) during the target time period is basically determined depending on the weather conditions during the target time period. The amount of electric power generated by power generator 14 (amount of private power generation E2) during the target time period is determined such that the $CO_2$ emission intensity does not become too high. Optimum load calculating unit 23 can control a power generation output of power generator 14 in accordance with a control command provided to power generator 14.

An amount of external power feeding E3 from FCEVs 9 to microgrid MG during the target time period is determined to fall within a range of the amount of electric power that can be externally supplied from FCEVs 9 selected by vehicle selecting unit 22, based on the amount of the hydrogen fuel in hydrogen tanks 902 of these FCEVs 9. By outputting an external power feeding command to EVSEs 17, optimum load calculating unit 23 can control the amount of external power feeding E3.

An amount of external charging E4 from microgrid MG to BEVs 8 during the target time period is determined to fall within a range of the amount of electric power that can be externally charged into BEVs 8 selected by vehicle selecting unit 22, based on the SOCs of the batteries of these BEVs 8. By outputting an external charging command to EVSEs 17, optimum load calculating unit 23 can control the amount of external charging E4.

An amount of charging E5 from microgrid MG to energy storage system 16 during the target time period is determined to fall within a range of the amount of electric power that can be charged into energy storage system 16, based on the amount of electric power stored in energy storage system 16. By outputting a charging command (not shown) to energy storage system 16, optimum load calculating unit 23 can control the amount of charging E5.

An amount of electric power supplied from power system 4 to microgrid MG (amount of system power E6) during the target time period is adjusted to satisfy the contract power. The amount of system power E6 is basically determined based on an amount of consumed power E0 by various power loads in CEMS 1 and the above-described amounts of electric power (E1 to E6). More specifically, as for an amount of electric power (=E1+E2+E3−E4−E5) obtained by subtracting a sum (=E4+E5) of the amount of external charging E4 and the amount of charging E5 from a sum (=E1+E2+E3) of the amount of natural power generation E1 and the amount of private power generation E2 and the amount of external power feeding E3, the amount of system power E6 makes up for a shortage with respect to the total amount of consumed power E0 in CEMS 1. Optimum load calculating unit 23 calculates the optimum load in CEMS 1 such that the power cost and the $CO_2$ emission intensity become sufficiently low and the amount of system power E6 during the target time period does not exceed the contract power.

Furthermore, optimum load calculating unit 23 transmits an adjustment command, a restriction command and a power generation command similarly to optimum load calculating unit 115 of FEMS server 110, and in addition, transmits an external power feeding command to FCEVs 9 and an external charging command to BEVs 8, to thereby adjust power supply and demand in microgrid MG. More specifically, optimum load calculating unit 23 distributes the amount of electric power (amount of external power feeding or amount of external charging) for satisfying the first and second adjustment requests to the vehicles (FCEVs 9 or BEVs 8) selected by vehicle selecting unit 22. A uniform amount of external power feeding may be distributed to respective FCEVs 9, or a larger amount of external power feeding may be distributed to FCEV 9 having a larger remaining amount of hydrogen fuel. A uniform amount of external charging may be distributed to respective BEVs 8, or a larger amount of external charging may be distributed to BEV 8 having a larger remaining amount of electric power (or having a higher SOC) of the battery.

Referring again to FIG. 5, refresh process managing unit 24 manages the execution timings of the refresh process in FCEVs 9 selected by vehicle selecting unit 22. At this time, in accordance with the optimum load calculated by optimum load calculating unit 23, refresh process managing unit 24 may set the number (permissible number) of FCEVs 9 that may execute the refresh process simultaneously. When there is a margin for absorbing electric power fluctuations in BEVs 8 and/or energy storage system 16 (such as when the number of BEVs 8 and/or energy storage system 16 is large), the permissible number may be set at two or more.

Vehicle selecting unit 22, optimum load calculating unit 23 and refresh process managing unit 24 are implemented by "processor" according to the present disclosure.

<Supply and Demand Adjustment Flow>

Figure 7:
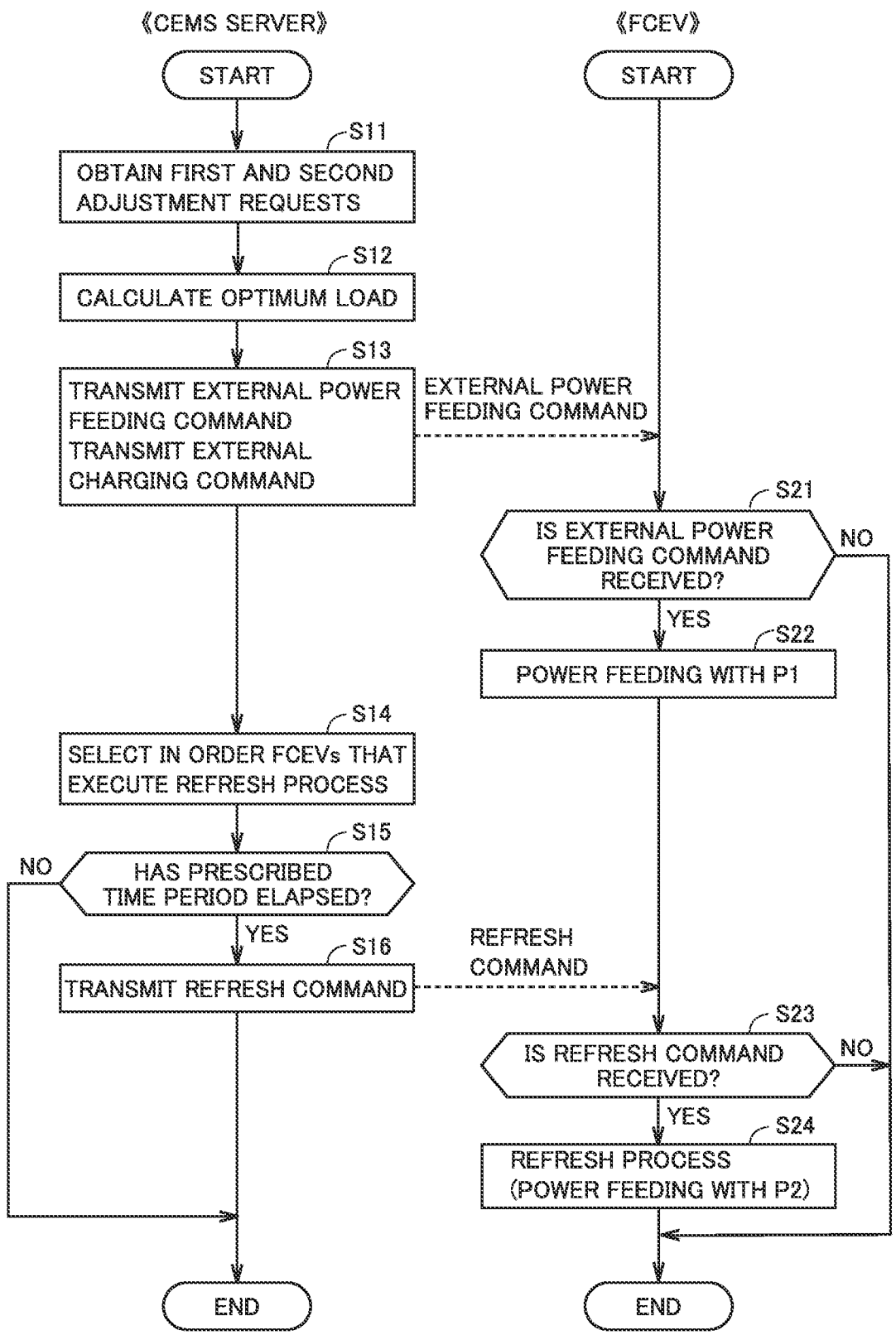
FIG. 7 is a flowchart showing a power supply and demand adjustment method in the first embodiment.

FIG. 7 is a flowchart showing a power supply and demand adjustment method in the first embodiment. The process shown in this flowchart is repeatedly executed at prescribed time intervals, for example. In FIG. 7, the process executed by CEMS server 2 is shown on the left side, and the process executed by FCEV 9 is shown on the right side. Although each step is implemented by software processing by the controller of CEMS server 2 or ECU 915 of FCEV 9, each step may be implemented by hardware (electric circuit) formed in the controller or ECU 915. Hereinafter, each step will be abbreviated as "S".

In S11, CEMS server 2 obtains, from power transmission and distribution business operator server 5, "first adjustment request" to request adjustment of power supply and demand between microgrid MG and power system 4. In addition, CEMS server 2 obtains, from each server in CEMS 1, "second adjustment request" to request adjustment of power supply and demand in microgrid MG. In this example, CEMS server 2 obtains, from FEMS server 110, the second adjustment request to adjust power supply and demand among FEMS 11, BEVs 8 and FCEVs 9.

In S12, CEMS server 2 calculates the optimum load in CEMS 1. The calculation method has been described in detail with reference to FIGS. 5 and 6, and thus, description will not be repeated. As a result of calculation of the optimum load, a plurality of FCEVs 9 that perform external power feeding, and BEVs 8 and energy storage system 16 that perform external charging are selected.

In S13, CEMS server 2 transmits the external power feeding command to FCEVs 9 (in this example, EVSEs 17 connected to these vehicles) selected in S12. In addition, CEMS server 2 transmits the external charging command to BEVs 8 (EVSEs 17 connected to these vehicles) selected in S12.

When FCEVs 9 receive the external power feeding command from CEMS server 2 (YES in S21), FCEVs 9 perform external power feeding with constant power P1 in a normal state (S22). Although P1 may be a predetermined value (fixed value), P1 may be a value (variable value) determined by CEMS server 2 such that the optimum load in CEMS 1 is achieved. When FCEVs 9 do not receive the external power feeding command from CEMS server 2 (NO in S21), FCEVs 9 await without performing external power feeding.

In S14, CEMS server 2 selects in order FCEVs 9 that execute the refresh process, from the plurality of FCEVs 9 that have received the external power feeding command. More specifically, when transmission of the refresh command to certain FCEV 9 (processing in S15 described below) is completed, CEMS server 2 selects a next vehicle. In the example shown in FIG. 4, vehicle V1, vehicle V2 and vehicle V3 are selected in this order.

In S15, as to FCEVs 9 selected in S14, CEMS server 2 determines whether or not a prescribed time period (e.g., several tens of minutes) has elapsed from the previous refresh process. When the prescribed time period has elapsed from the previous refresh process (YES in S15), CEMS server 2 transmits the refresh command to selected FCEVs 9 (EVSEs 17 connected to these vehicles) (S16). The refresh command is not transmitted until the prescribed time period elapses from the previous refresh process (NO in S15).

When FCEVs 9 receive the refresh command from CEMS server 2 (YES in S23), FCEVs 9 execute the refresh process (S24). Specifically, as described with reference to FIG. 3 or 4, FCEVs 9 temporarily (momentarily) increase the electric power supplied to microgrid MG from P1 in a normal state to P2 that is several times as large as P1.

As described above, in the first embodiment, respective FCEVs 9 execute the refresh process regularly in accordance with the control by CEMS server 2. At this time, the execution timings of the refresh process in the plurality of FCEVs 9 are adjusted so as not to overlap with each other. Therefore, even when the electric power supplied from FCEVs 9 to microgrid MG increases temporarily due to the refresh process, an influence on adjustment of power supply and demand between microgrid MG and power system 4 can be minimized. Thus, according to the first embodiment, the oxide films formed on the catalyst electrodes of FCEVs 9 can be appropriately removed during external power feeding from FCEVs 9 to microgrid MG.

However, the execution timings of the refresh process are not necessarily adjusted to be different from each other among all of FCEVs 9 that have received the external power feeding command. As described above, when there is a margin for absorbing electric power fluctuations in BEVs 8 and/or energy storage system 16, not more than the permissible number of FCEVs 9 may execute the refresh process simultaneously. For example, two FCEVs 9 may be selected at a time, and selected two FCEVs 9 may execute the refresh process simultaneously.

Second Embodiment

In the first embodiment, the configuration in which CEMS server 2 causes the plurality of FCEVs 9 to execute the refresh process regularly has been described. In a second embodiment, a configuration in which CEMS server 2 permits execution of the refresh process in accordance with a request from the FCEV 9 side will be described. Since an overall configuration of a power management system and a configuration of each FCEV 9 in the second embodiment are equivalent to the configurations described with reference to FIGS. 1 and 2, description will not be repeated.

FIG. 8 is a flowchart showing a power supply and demand adjustment method in the second embodiment. The processing in S31 to S33 is similar to the processing in S11 to S13 in the first embodiment (see FIG. 7). When FCEVs 9 receive the external power feeding command from CEMS server 2 (YES in S41), FCEVs 9 perform external power feeding with P1 in a normal state (S42).

Generally, when an oxide film is formed on a catalyst electrode of a fuel cell, the resistance of the catalyst electrode increases, as compared with when the oxide film is not formed on the catalyst electrode. Therefore, assuming that the electric power generated by the fuel cell is constant, an amount of voltage drop during power generation becomes larger as the formation of the oxide film progresses. From a different perspective, a degree of formation of the oxide film can be estimated based on the amount of voltage drop during power generation in the fuel cell.

During external power feeding with constant power P1, each FCEV 9 monitors a power generation voltage of FC stack 906 using a not-shown voltage sensor. Then, FCEV 9 determines whether or not the power generation voltage has decreased below a prescribed voltage (e.g., an initial value or a specification value in a state where the oxide film is not formed on the catalyst electrode of FC stack 906) (S43). FCEV 9 may determine whether or not the power generation voltage has decreased, based on an amount of decrease in the power generation voltage within a predetermined time range.

When the power generation voltage has decreased (YES in S43), FCEV 9 transmits a request (refresh request) for permission of execution of the refresh process to CEMS server 2 through EVSE 17 (S44).

When CEMS server 2 receives the refresh requests from the plurality of FCEVs 9 in an overlapping manner (YES in S34), CEMS server 2 determines the order of execution of the refresh process (S35). For example, CEMS server 2 may determine the order of execution in accordance with a remaining time period in which each FCEV 9 can continue external power feeding. As one example, when the remaining time period is short, the refresh process may be executed preferentially. Alternatively, CEMS server 2 may determine the order of execution in accordance with a predetermined priority based on the vehicle ID, the EVSE-ID or the like.

In accordance with the order of execution determined in S35, CEMS server 2 transmits refresh permissions to FCEVs 9 (EVSEs 17 connected to these vehicles) in ascending order of execution (S36). When the refresh requests do not overlap with each other (NO in S35), CEMS server 2 can transmit the refresh permission to FCEV 9 that has transmitted the refresh request (S35).

FCEV 9 awaits until FCEV 9 receives the refresh permission from CEMS server 2 (NO in S45). When FCEV 9 receives the refresh permission (YES in S45), FCEV 9 executes the refresh process similarly to the first embodiment (S46).

As described above, in the second embodiment, CEMS server 2 transmits the refresh permission in response to the refresh request from each FCEV 9. At this time, CEMS server 2 determines the order of execution of the refresh process in accordance with the prescribed procedure, and thus, the execution timings of the refresh process in the plurality of FCEVs 9 are adjusted so as not to overlap with each other. Therefore, even when the electric power supplied from FCEVs 9 to microgrid MG increases temporarily due to the refresh process, an influence on adjustment of power supply and demand between microgrid MG and power system 4 can be minimized. Thus, according to the second embodiment, the oxide films formed on the catalyst electrodes can be appropriately removed during external power feeding from FCEVs 9 to microgrid MG.

Similarly to the first embodiment, in the second embodiment as well, when there is a margin for absorbing electric power fluctuations in BEVs 8 and/or energy storage system 16, CEMS server 2 may simultaneously transmit the refresh permissions to not more than the permissible number of FCEVs 9.

By simply executing the refresh process intermittently or regularly as in the first embodiment, a computation process executed by CEMS server 2 to manage the execution timings of the refresh process can be simplified. As a result, implementation of CEMS server 2 becomes easy. In contrast, in the first embodiment, the refresh process may be executed even when the oxide film is not formed on the catalyst electrode of FC stack 906. When the refresh process is executed excessively, degradation of FC stack 906 may progress.

In order to deal with this, in the second embodiment, the power generation voltage of FC stack 906 is monitored, and the request for the refresh process is transmitted from FCEV 9 based on the condition that the power generation voltage has decreased. Thus, the refresh process is executed only when the formation of the oxide film on the catalyst electrode is estimated, and thus, the number of times of the refresh process is reduced, as compared with the case of executing the refresh process intermittently or regularly. As a result, degradation of FC stack 906 can be suppressed.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A power management system comprising:
a plurality of power adjustment resources electrically connected to a power grid; and
a server that manages the plurality of power adjustment resources, wherein
the plurality of power adjustment resources include a plurality of fuel cell electric vehicles that each supplies electric power to the power grid,
the plurality of fuel cell electric vehicles each executes a refresh process that removes an oxide film formed on a platinum catalyst electrode of a fuel cell by causing the fuel cell to increase generated electric power to exceed prescribed electric power for a period of time of approximately several hundred milliseconds to several seconds, and
the server controls the plurality of fuel cell electric vehicles such that each of the plurality of fuel cell electric vehicles repeats the refresh process intermittently, and adjusts execution timings such that the refresh process is repeated without any overlap of the execution timings in the plurality of fuel cell electric vehicles.

2. The power management system according to claim 1, wherein
the execution timings are regular.

3. The power management system according to claim 1, wherein
the plurality of power adjustment resources further include a plurality of power storage facilities that store electric power transmitted to the power grid, and
the server selects, from the plurality of power storage facilities, a power storage facility that absorbs an increase in the electric power supplied to the power grid due to the refresh process.

4. A server that manages a plurality of power adjustment resources electrically connected to a power grid, wherein
the plurality of power adjustment resources include a plurality of fuel cell electric vehicles that each supplies electric power to the power grid,
the plurality of fuel cell electric vehicles each executes a refresh process that removes an oxide film formed on a platinum catalyst electrode of a fuel cell by causing the fuel cell to increase generated electric power to exceed prescribed electric power for a time period of approximately several hundred milliseconds to several seconds,
the server includes:
a processor; and
a memory that stores a program executed by the processor, and
the processor adjusts execution timings of the refresh process in the at least one fuel cell electric vehicle during power supply to the power grid such that the refresh process is repeated without any overlap of the execution timings in the plurality of fuel cell electric vehicles.

5. A power supply and demand adjustment method that manages a plurality of power adjustment resources electrically connected to a power grid, wherein the plurality of power adjustment resources include a plurality of fuel cell electric vehicles that each supplies electric power to the power grid, the plurality of fuel cell electric vehicles each executes a refresh process that removes an oxide film formed on a platinum catalyst electrode of a fuel cell by causing the fuel cell to increase generated electric power to exceed prescribed electric power for a time period of approximately several hundred milliseconds to several seconds, the method comprising:

determining execution timings of the refresh process in the plurality of fuel cell electric vehicles during power supply to the power grid, and transmitting a command to execute the refresh process based on a result of the determination, the determining including adjusting the execution timings such that the refresh process is repeated without any overlap of the execution timings in the plurality of fuel cell electric vehicles; and causing a fuel cell electric vehicle that receives the command, of the plurality of fuel cell electric vehicles, to execute the refresh process.

* * * * *